Aug. 29, 1967  C. MORRIS  3,338,698
BLANK FORMING APPARATUS FOR GLASS RIBBON FORMING MACHINE
Filed Jan. 2, 1964  3 Sheets-Sheet 1

INVENTOR
CYRIL MORRIS
By: Norris + Bateman
Attys

Aug. 29, 1967  C. MORRIS  3,338,698
BLANK FORMING APPARATUS FOR GLASS RIBBON FORMING MACHINE
Filed Jan. 2, 1964  3 Sheets-Sheet 2

INVENTOR
CYRIL MORRIS
By Norris & Bateman
Attys

Aug. 29, 1967     C. MORRIS     3,338,698
BLANK FORMING APPARATUS FOR GLASS RIBBON FORMING MACHINE
Filed Jan. 2, 1964     3 Sheets-Sheet 3
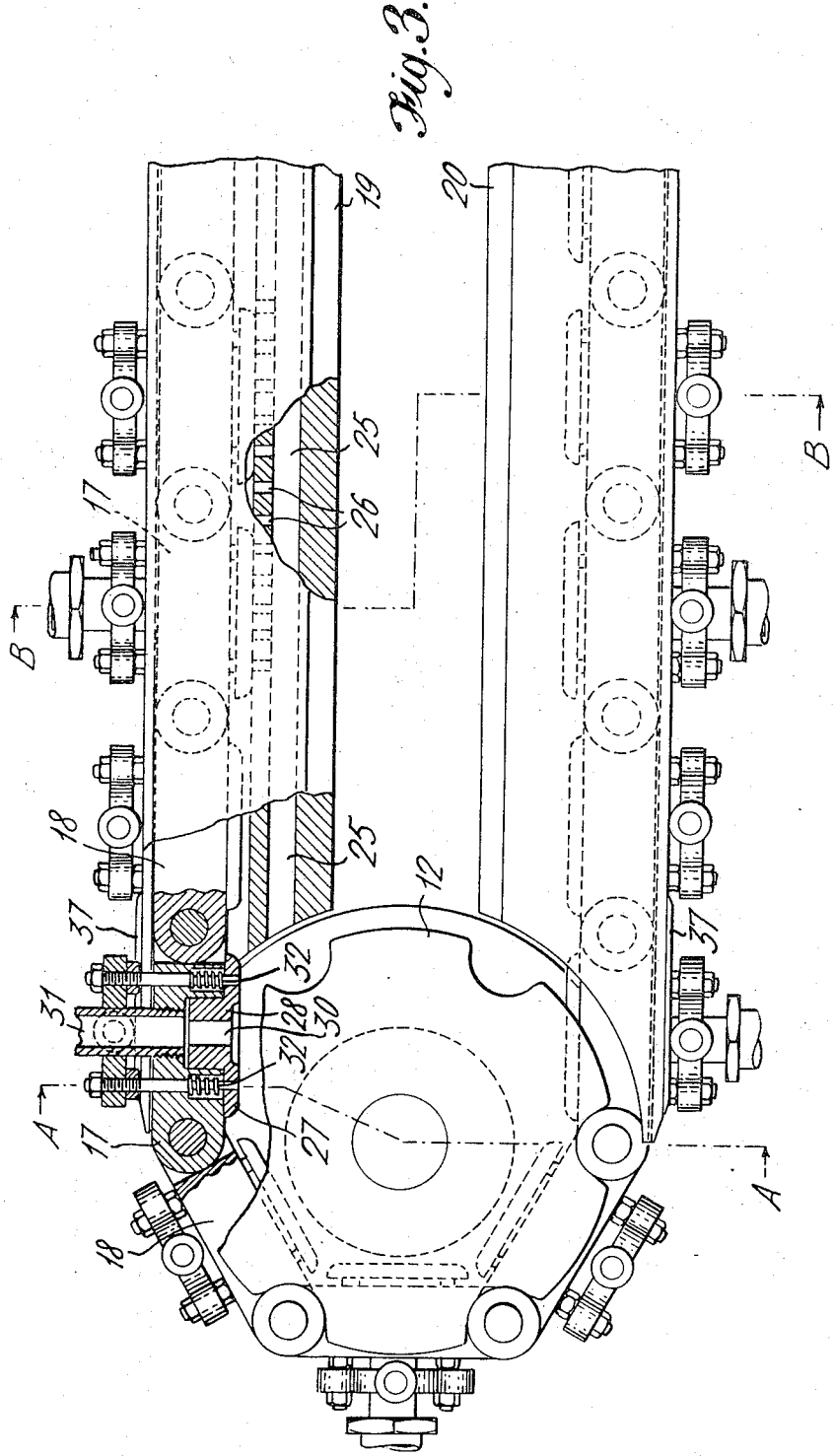
INVENTOR
CYRIL MORRIS
By: Norris + Bateman
Attys United States Patent Office 3,338,698
Patented Aug. 29, 1967

3,338,698
BLANK FORMING APPARATUS FOR GLASS
RIBBON FORMING MACHINE
Cyril Morris, Harworth, near Doncaster, England, assignor to Glass Bulbs Limited, London, England, a British company
Filed Jan. 2, 1964, Ser. No. 335,298
Claims priority, application Great Britain, Jan. 7, 1963, 705/63
10 Claims. (Cl. 65—184)

This invention relates to automatic glass-forming machines of the ribbon type, namely in which, in the significance of this term as understood in the art and used herein, a ribbon of viscous glass is fed on to a moving conveyor and articles are formed from it by means of blow-heads and moulds which come into position on opposite sides of the ribbon in registration with apertures spaced along the conveyor and covered by the ribbon. As the ribbon of glass is fed on to the conveyor the glass begins to sag through the apertures and the blow-heads come round in an endless chain to engage the surface of the ribbon round the apertures. Each blow-head effects an initial blowing action which causes the sagging glass in the registering aperture to develop below the conveyor as a glass blank. Blowing is subsequently completed in moulds which close round the developed blanks after coming into position, also in an endless chain. The moulds re-open and withdraw in their chain after the blown and moulded glass has had time to cool to a self-supporting state. The blow-heads also withdraw in their chain leaving the ribbon with the formed articles still attached to it through the conveyor apertures. Finally the formed articles are separated from the ribbon and the conveyor, usually by sharply knocking them sideways, and the remainder of the ribbon is separated from the conveyor as scrap.

A detailed description of a ribbon type glass forming machine can be found in British patent specification No. 276,606.

Ribbon machines are most commonly employed for making the glass bulbs for electric lamps, being particularly suited to the manufacture of articles of this general shape because the natural form of the developing blanks already tends towards the required final shape. Because the developing blanks have this natural form and the incorporation of blank moulds is not readily practicable in this type of machine, the manufacture of articles having a more cylindrical shape with a more abruptly necked, or cut-in, portion gives rise to difficulty especially when the neck dimension is considerably smaller than that of the remainder of the article: an example of such a necked article is the inner glass container of certain types of vacuum flask produced in Great Britain.

With a view to alleviating this difficulty it is proposed according to the present invention to provide an apparatus (hereinafter referred to as necking apparatus) for temporarily bringing into position round the blanks, so as to travel with them in the development section of the machine, mobile air manifolds by which air is directed on to the developing blanks round substantially the whole periphery thereof at a level appropriate to a desired neck position in the final article. With suitable control of the quantity and pressure of the air supplied by the manifolds, the air tends to pre-shape the developing blanks into a more cylindrical shape and also tends, by cooling the glass at the neck position of the blank, to cut-in the blanks at this position so that they will already be significantly necked when they reach the moulding section of the machine. The manifolds will be withdrawn from the blanks in time to permit the moulds to come into position and close round the blanks without interference.

It is contemplated to provide the manifolds in endless chain formation, as are the blow-heads and moulds, and in order to facilitate travel of the manifolds into their operative positions in relation to the developing blanks it is preferred to use manifolds which are so shaped as each to extend round only a portion of the periphery of a blank at one side thereof relative to the centre line of the ribbon, the manifolds thus provided for each side being included in a separate chain which brings them into position from that side. While such manifolds could conceivably be of approximately semi-annular form co-operating in pairs, one at each side, to form substantially a complete annulus round each blank, it is preferred for each manifold to be of generally cuspidal form with two approximately quadrantal portions such that by bringing the manifolds into position from opposite sides with their cusps projecting between adjacent blanks, each blank will be substantially surrounded by a combination of four quadrantal manifold portions each belonging to a different manifold. Such manifolds of cuspidal form can be fed into position in relation to the blanks within a shorter distance of travel than could semi-annular manifolds.

The invention and the manner in which it may be put into practice may be more fully appreciated from the following description of an exemplary embodiment which is illustrated in the accompanying drawings, in which.

Figure 1:
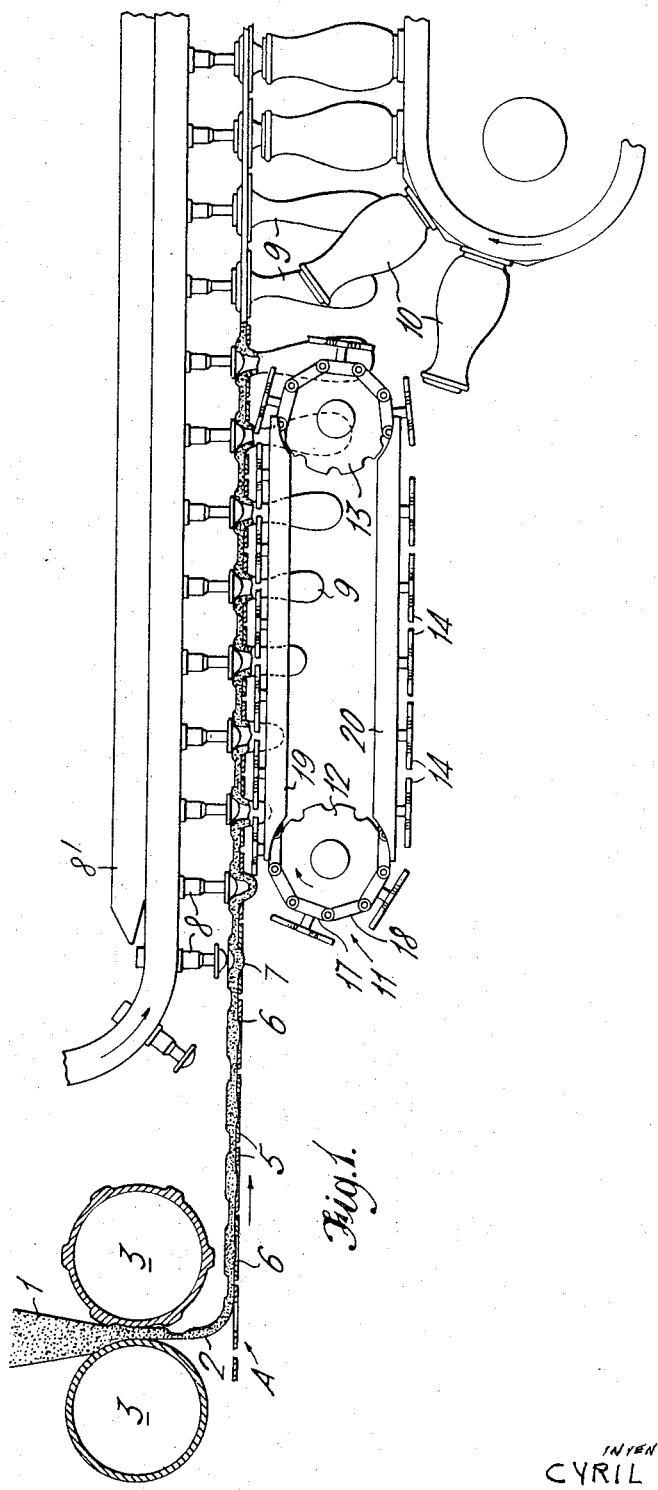
FIG. 1 is a general side view of the feed end of a ribbon machine embodying the invention.
Figure 4:
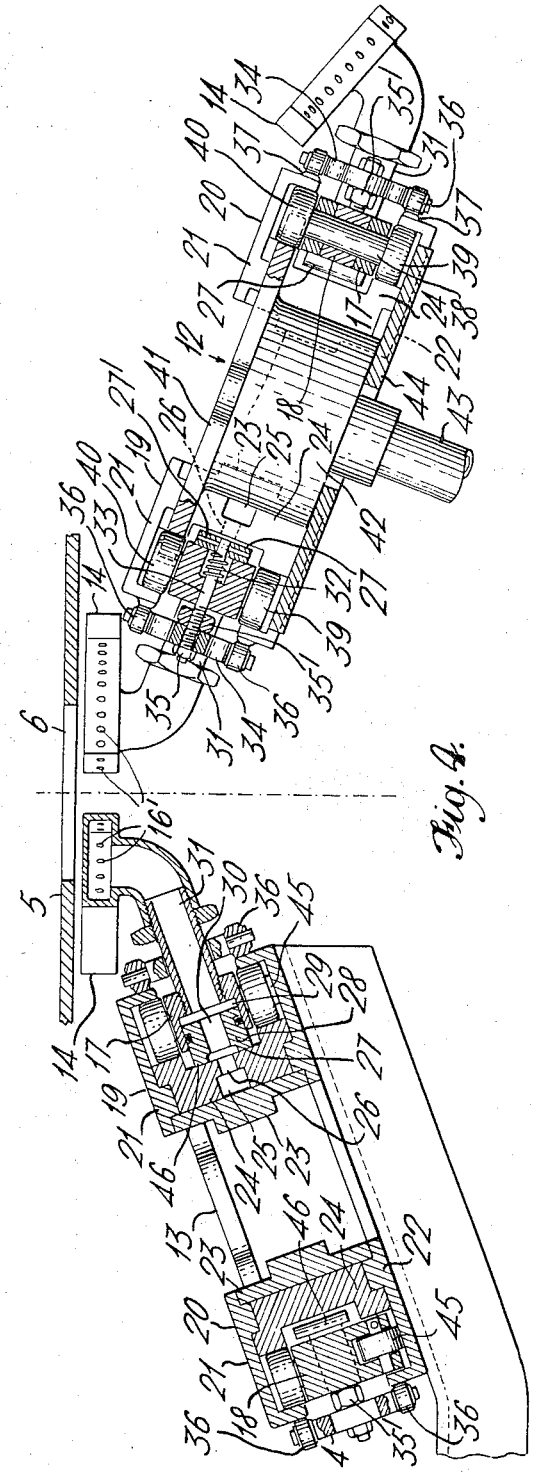

FIG. 3 is a broken-away, part-sectional view on an enlarged scale of part of the manifold chain, driving sprocket and guide channels seen in FIG. 1; and FIG. 4 is a sectional end view of which the left-hand half is a section on line A—A in FIG. 3 through the manifold chain on one side of the centre line of the ribbon, and the right-hand half is a section taken through the corresponding manifold chain on the other side of the centre line on a line corresponding to B—B in FIG. 3.

Referring to FIG. 1, viscous glass 1 coming from a furnace is formed into a ribbon 2 by means of a pair of rollers 3 and is fed on to a travelling conveyor 4 formed by an endless chain of orifice plates 5. The glass of the ribbon begins to sag through the orifices 6 in the plates 5 as indicated at 7. Blow-heads 8 in a continuous chain register with the orifices 6 and engage the surface of the ribbon around these orifices, effecting an initial blowing action which results in the sagging glass elongating below the conveyor as developing blanks 9. At the end of this development section of the machine, moulds 10, also on an endless chain, come into registration with the orifices 6 and close on to the developed blanks, which are then blown to their final shape in the moulds and partly allowed to cool before the moulds are subsequently re-opened and are withdrawn from the conveyor on their chain (as are also the blowheads 8) near the other end of the machine (not shown). The blow-heads 8 take their air from a blow-box 8' and are supplied with air in regulated quantities from this blow-box by means of valves or ports.

Figure 2:
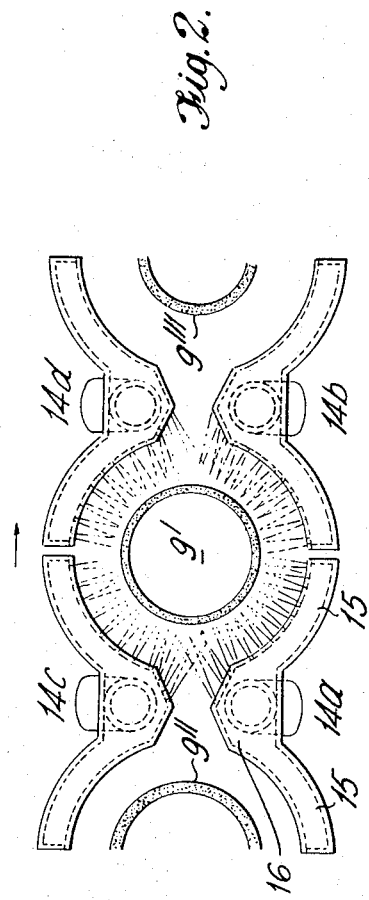
FIG. 2 is a plan view of two pairs of manifolds showing their general shape and the manner in which they embrace a developing blank so as to act together in directing air on to the blank around substantially its entire periphery.

In the development section of the machine, according to the invention, there is provided on opposite sides of the centre line of the ribbon two additional endless chains 11 each passing round sprockets such as 12 and 13 and carrying an endless succession of air manifolds 14. Two adjacent manifolds 14a and 14b from the chain 11 seen in FIG. 1, and a corresponding pair of adjacent manifolds 14c and 14d from the other chain 11 on the other side of the centre line of the ribbon, are shown in FIG. 2. Each manifold has a generally cuspidal shape with two approximately quadrantal arms such as 15 and an intermediate cusp portion 16. Each manifold comes into position between the positions of two adjacent blanks such as 9′ and 9″ or 9′ and 9‴ so that the position occupied by each blank such as 9′ is surrounded, at a level closely below the orifice plates 5 of the conveyor 4 by a virtually complete manifold annulus constituted by four quadrantal manifold portions belonging one to each of four manifolds such as 14a, 14b, 14c and 14d. As indicated in FIG. 2 the manifolds direct air on to the outer surface of the developing blank 9′ round its whole periphery, being for this purpose provided with a suitable arrangement of air openings 16′ (FIG. 4) on their inwardly facing surfaces. As a result of the action of the manifolds the developing blanks are "cut-in" so as to have a more pronounced neck tending to circular cross-section than could otherwise be obtained, and also the blanks tend to be more cylindrical. Each manifold chain 11 is driven in proper synchronism with the remainder of the machine by driving one of its sprockets 12 or 13 through suitable mechanical coupling (not shown) from some suitable part of the overall machine drive.

Each chain 11 is made up of links 17 which carry the manifolds 14 and intermediate links 18. For instance for a machine in which the orifices in the conveyor 4 are at six-inch centres each link can have an effective length of three inches. The links 17 and 18 of the chain 11 are guided for their forward travel between the sprockets 12 and 13 in a guide channel 19 and for their return travel in a guide channel 20. The manifolds 14 receive their air through their links 17 from a supply duct formed in the guide channel 19, which therefore also serves as a blowbox for the manifolds.

More particularly the chain links 17 and 18 and the guide channels 19 and 20 may take the forms illustrated in FIGS. 3 and 4. Referring to these figures, each of the guide channels 19 and 20 comprises two side walls 21 and 22, a rear wall 23 and an internal bottom plate 24. In the channel 19, but not 20, the bottom plate 24 is formed with a longitudinal groove 25 which in conjunction with the rear plate 23 forms a supply duct which extends along the greater part of the length of the guide channel 19 either as a single uninterrupted duct or, preferably, in a number of mutually isolated sections permitting different air pressures to be fed to the manifolds at different positions during their travel with the developing blanks. A series of closely spaced outlet ports 26 from the duct 25 are formed in the inside surface of the plate 24, and each of the manifold links 17 carries a slipper 27 which, during travel of the link along the guide channel 19, slides along this inside surface within a groove 24′ in the plate 24 and feeds air from the ports 26 through the link to its manifold. To this latter end each slipper 27 is formed with a central boss 28 which fits within a corresponding socket 29 in the link 17 and through which extends a passageway 30 affording communication from the face of the slipper 27 (and therefore the air ports 26) to rigid tubing 31 leading from the link to its manifold 14, the latter being supported by this tubing 31. The slipper 27 is urged against the surface of the blocks 24 during the travel of the link along the channel 19 by means of springs 32 accommodated in suitable recesses in the link 17. These springs 32 surround guide rods 33 which at one end are secured to the slipper 27, for instance by means of grub screws 27′, and at the other end pass through a yoke 34 and carry stop nuts 35. This yoke 34, which freely surrounds the tubing 31, carries rollers 36 which, at the beginning and end of at least the guide channels 19, engage a cam surface 37 so that the yoke 34, acting through the stop nuts 35 and the guide rods 33, temporarily raises the slipper 27 away from the inside surface of the plate 24 as the link is entering and leaving the guide channel, whereby to reduce wear on the slipper.

In the return guide channels 20 the grooves 24′ in the bottom plates 24 are made somewhat deeper than in the channels 19. During travel of a link along a return channel 20, the slipper 27 of the link is held clear of the inside surface of the plate 24 by means of spacer nuts 35′ which come into engagement with the outside surface of the link (see FIG. 4, bottom right).

Adjacent links 17 and 18 are articulated by means of an axle 38 carrying on opposite sides of the links guide rollers 39 and 40 which run in the guide channels 19 and 20. The rollers 40 are engaged by the sprockets 12 and 13, each of which comprises a sprocket disc 41 having a hub 42 on a bearing shaft 43, which in the case of one of the sprockets 12 or 13 for each chain also constitutes the driving shaft for that sprocket. Attached to the hub 42 is a disc 44 which supports the chain as it passes round the sprocket, for which purpose the intermediate links 18 are provided with rollers 45 which run round on this disc 44. These rollers 45 also support the chains as they run through the guide channels 19 and 20. The intermediate links 18 also carry slippers 46 which, having no through-passage corresponding to 30 in the slippers 27, blank-off the ports 26 as the links 18 pass through the channel 19. These slippers 46, like the slippers 27 of the manifold links 17 are spring-loaded by means of springs 32 which, as before, surround guide rods 33 secured to members corresponding to the yokes 34 and carrying stop and spacer nuts 35 and 35′.

What I claim is:

1. In a glass-forming machine of the ribbon type having a development section wherein spaced regions of a moving ribbon of viscous glass are formed into hollow blanks and a succeeding moulding section wherein the developed blanks are enclosed by moulds for final shaping while still attached to said ribbon, necking apparatus in the development section comprising air manifold means for directing air on to the peripheries of the developing glass blanks while in travelling positions of operative relationship therewith during their travel through the development section, said positions being at a predetermined necking level relatively to the positions of the glass blanks in the development section, a plurality of shaped mobile air-directing manifolds constituting said air manifold means and movable into and out of said positions of operative relationship with the glass blanks, said shaped manifolds forming, when in said positions of operative relationship, substantially complete manifold annuli surrounding said glass blank positions at necking level and directing air round substantially the entire periphery thereof, and means for causing said manifolds recurrently to travel along said development section in said positions of operative relationship.

2. In a glass-forming machine of the ribbon type necking apparatus as claimed in claim 1 comprising air manifolds having shapes individually defining only parts of such annuli, each such part being a part on one side of the ribbon centre line of the machine, respective endless chains at the opposite sides of said centre line, carrying said manifolds in mutually cooperative positional relationship on said opposite sides, and means for driving said chains to bring the manifolds on each side successively into said positions of operative relationship from their own side, said manifolds there cooperating in forming said manifold annuli round the glass blank positions.

3. In a glass forming machine of the ribbon type necking apparatus as claimed in claim 2 wherein each manifold is of generally cuspidal form having two approximately quadrant portions and an intermediate cusp portion projecting, in the operative relationship position of the manifold, between adjacent glass blank positions each of which is thereby surrounded by a substantially complete manifold annulus constituted by four quadrant portions each belonging to a different manifold two from each side.

4. In a glass-forming machine of the ribbon type necking apparatus as claimed in claim 3 including for each said chain a guide channel having air supply ducting, and a plurality of mobile assemblies each including one of said air manifolds together with a chain link arranged to be guided by said channel during the travel of the manifold along said development section, said assembly also including air passages for feeding air to the manifold from said ducting during such travel.

5. In a glass-forming machine of the ribbon type necking apparatus as claimed in claim 4 wherein the inner surface of said guide channel is formed with a longitudinal series of outlet ports from said ducting and each chain link-manifold assembly includes a slipper which, being arranged to slide along said surface, is formed with a passageway communicating between the sliding face of the slipper and an air passage leading to the manifold, said passageway in the slipper opening to the sliding face thereof at a position such as to come successively into alignment with said ports as the assembly moves along the guide channel.

6. In a glass-forming machine of the ribbon type necking apparatus as claimed in claim 5 including between the chain links of successive chain link-manifold assemblies intermediate chain links carrying blanking-off slippers arranged also to slide along said guide channel surface and effective to blank-off said ports therein.

7. In a glass-forming machine of the ribbon type necking apparatus as claimed in claim 5 including means for temporarily raising said slippers away from the channel surface upon entering and leaving the guide channel.

8. In a glass-forming machine of the ribbon type necking apparatus as claimed in claim 5 including in respect of adjacent links of each chain an articulating axle having guide rollers arranged to run in the guide channel for the chain.

9. In a glass-forming machine of the ribbon type necking apparatus as claimed in claim 6 including in respect of adjacent links of each chain an articulating axle having guide rollers arranged to run on a surface of the guide channel for the chain, and also including on the intermediate chain links further rollers having their axes perpendicular to those of said guide rollers and arranged to run on a perpendicular surface of the guide channel.

10. In an automatic machine for forming glass bulbs and like hollow articles from a moving ribbon of viscous glass comprising conveyor means for moving the ribbon along a path and formed with a series of apertures underlying the ribbon and blowing means for developing portions of the moving ribbon into hollow blanks projecting through said apertures, the improvement which comprises means for positioning substantially annular fluid pressure manifold means around each developing blank adjacent said conveyor means, moving said positioned manifold means along said path and then removing said manifold means from association with said blanks, said manifold means being arranged to discharge a substantial annular stream of fluid under pressure for forming a neck on each developing blank moving along said path.

References Cited
UNITED STATES PATENTS 1,943,195    1/1934    Van Ness _____ 65—184
2,263,126    11/1941    Gray et al. _____ 65—243

DONALL H. SYLVESTER, *Primary Examiner.*

S. LEON BASHORE, *Examiner.*

F. W. MIGA, *Assistant Examiner.*